United States Patent
Haggar et al.

(10) Patent No.: US 8,453,062 B2
(45) Date of Patent: May 28, 2013

(54) VIRTUAL WORLD VIEWER

(75) Inventors: Peter Frederick Haggar, Raleigh, NC (US); Brian Ronald Bokor, Raleigh, NC (US); Andrew Bryan Smith, Morrisville, NC (US); Daniel Edward House, Raleigh, NC (US); William Bruce Nicol, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 12/370,747

(22) Filed: Feb. 13, 2009

(65) Prior Publication Data

US 2010/0211880 A1 Aug. 19, 2010

(51) Int. Cl.
*G06F 3/048* (2006.01)

(52) U.S. Cl.
USPC ............ 715/757; 715/759; 715/762; 715/765

(58) Field of Classification Search
USPC .................. 715/738, 851, 753–760, 762–765
See application file for complete search history.

(56) References Cited

U.S. PATENT DOCUMENTS

| | | | | |
|---|---|---|---|---|
| 5,808,614 A * | 9/1998 | Nagahara et al. | ............... | 715/848 |
| 5,982,372 A * | 11/1999 | Brush et al. | ................... | 345/418 |
| 6,016,145 A * | 1/2000 | Horvitz et al. | ................ | 715/788 |
| 6,215,498 B1 * | 4/2001 | Filo et al. | ....................... | 345/419 |
| 6,753,857 B1 * | 6/2004 | Matsuura et al. | ............. | 345/419 |
| 7,155,680 B2 * | 12/2006 | Akazawa et al. | ............. | 715/757 |
| 7,269,632 B2 * | 9/2007 | Edeker et al. | ................ | 709/217 |
| 2008/0143722 A1 * | 6/2008 | Pagan | ............................. | 345/427 |
| 2008/0204449 A1 * | 8/2008 | Dawson et al. | ............... | 345/419 |
| 2009/0063983 A1 * | 3/2009 | Amidon et al. | ............... | 715/733 |
| 2009/0094106 A1 * | 4/2009 | Porter et al. | .................... | 705/14 |
| 2009/0106347 A1 * | 4/2009 | Harwood et al. | ............ | 709/203 |
| 2009/0106671 A1 * | 4/2009 | Olson et al. | .................... | 715/757 |
| 2009/0165140 A1 * | 6/2009 | Robinson et al. | ............... | 726/26 |
| 2009/0199095 A1 * | 8/2009 | Nicol et al. | ................... | 715/704 |
| 2010/0064253 A1 * | 3/2010 | Bates et al. | .................... | 715/810 |
| 2010/0076970 A1 * | 3/2010 | Bates et al. | ................... | 707/736 |
| 2010/0257464 A1 * | 10/2010 | Renner | ......................... | 715/757 |

* cited by examiner

*Primary Examiner* — Tadeese Hailu
(74) *Attorney, Agent, or Firm* — Moore & Van Allen PLLC

(57) ABSTRACT

A method for managing and operating one or more virtual world viewers in a virtual world may include generating a virtual world viewer feature on a computer system in response to a predetermined action by the user. The method may also include generating an option in the virtual world viewer feature for the user to either enter or select a different virtual world location from a current virtual world location of a user's avatar for locating a virtual world viewer for viewing the different virtual world location. The virtual world viewer may be generated on the computer system for the user to view the different virtual world location without the user's avatar leaving the current virtual world location.

26 Claims, 4 Drawing Sheets

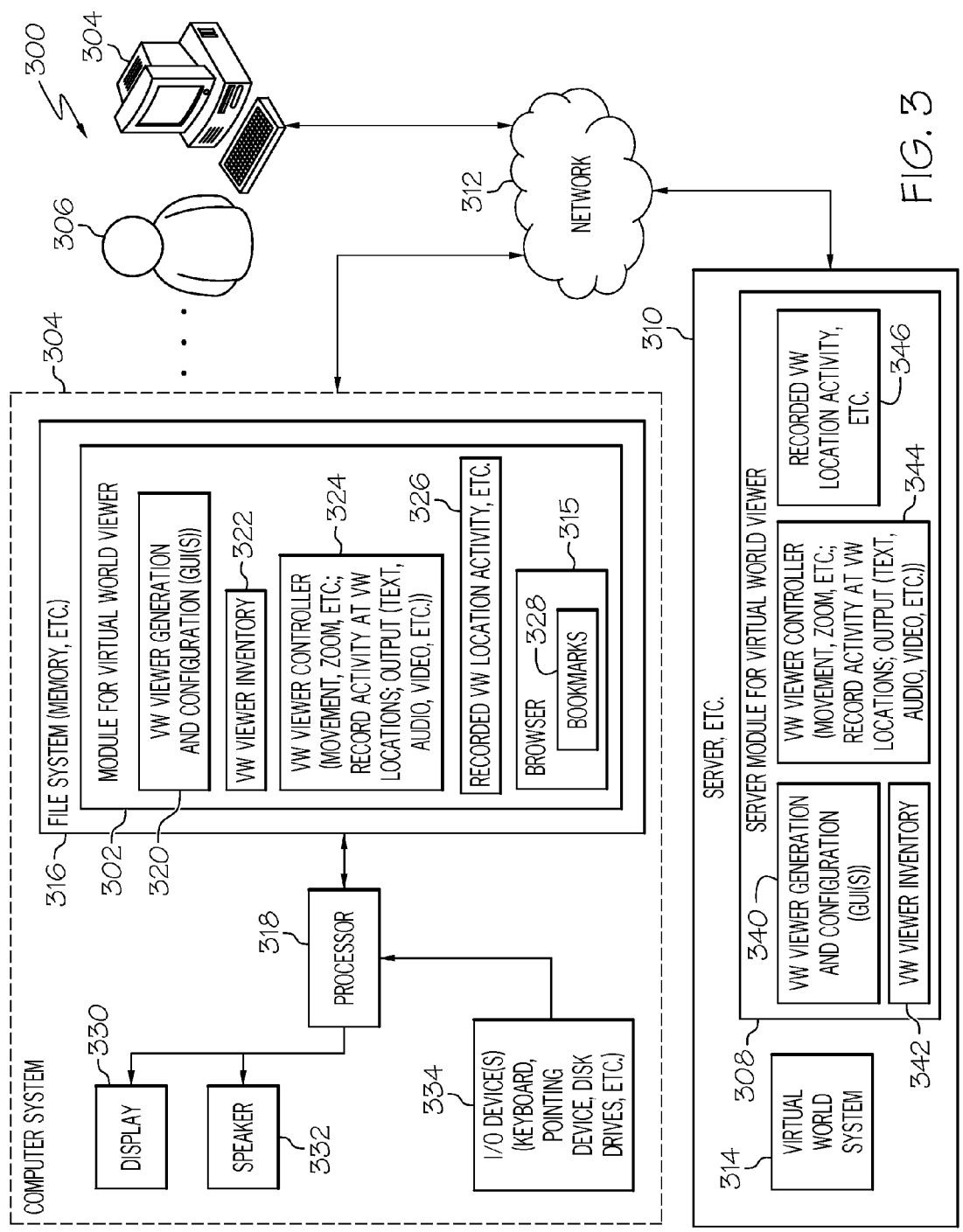

VIRTUAL WORLD VIEWER

BACKGROUND OF THE INVENTION

The present invention relates to simulations, virtual world simulations of the real-world or real-life or a virtual world and the like, and more particularly to a system and method for managing at least one virtual world viewer in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Currently, an avatar in a virtual world, controlled by a user, may only view one location at a time. If a user wanted her avatar to view more than one virtual world location, the user must navigate her avatar to each location one by one. This approach can have significant drawbacks. For example, the user cannot view two different locations simultaneously.

BRIEF SUMMARY OF THE INVENTION

In accordance with an aspect of the present invention, a computer implemented method for managing one or more virtual world viewers in a virtual world may include generating a virtual world viewer feature to a user on a display in response to a predetermined action by the user. The method may also include generating an option in the virtual world viewer feature for the user to enter or select a different virtual world location from a current virtual world location of a user's avatar for locating a virtual world viewer for viewing the different virtual world location. The method may further include generating the virtual world viewer on the computer system for viewing the different virtual world location without the user's avatar leaving the current virtual world location.

In accordance with another aspect of the present invention, a system for managing at least one virtual world viewer may include a processor, and a module operable on the processor. The module may be configured to generate a virtual world viewer feature in response to a predetermined action by a user. The module may also be configured to generate an option in the virtual world viewer feature for the user to enter or select a different virtual world location from a current virtual world location of a user's avatar for locating a virtual world viewer for viewing the different virtual world location. The module may further be configured to generate the virtual world viewer for the user to view the different virtual world location without the user's avatar leaving the current virtual world location.

In accordance with another aspect of the present invention, a computer program product for managing at least one virtual world viewer may include a computer usable medium having computer usable program code embodied therein. The computer usable medium may include computer usable program code configured to generate a virtual world viewer feature in response to a predetermined action by the user. The computer usable medium may further include computer usable program code configured to generate an option in the virtual world viewer feature for the user to enter or select a different virtual world location from a current virtual world location of a user's avatar for locating a virtual world viewer for viewing the different virtual world location. The computer usable medium may yet further include computer usable program code configured to generate the virtual world viewer for the user to view the different virtual world location without the user's avatar leaving the current virtual world location.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 3 is a block schematic diagram of an example of a system for managing a virtual world viewer in a virtual world in accordance with an embodiment of the present invention.

DETAILED DESCRIPTION OF THE INVENTION

Figure 1A:
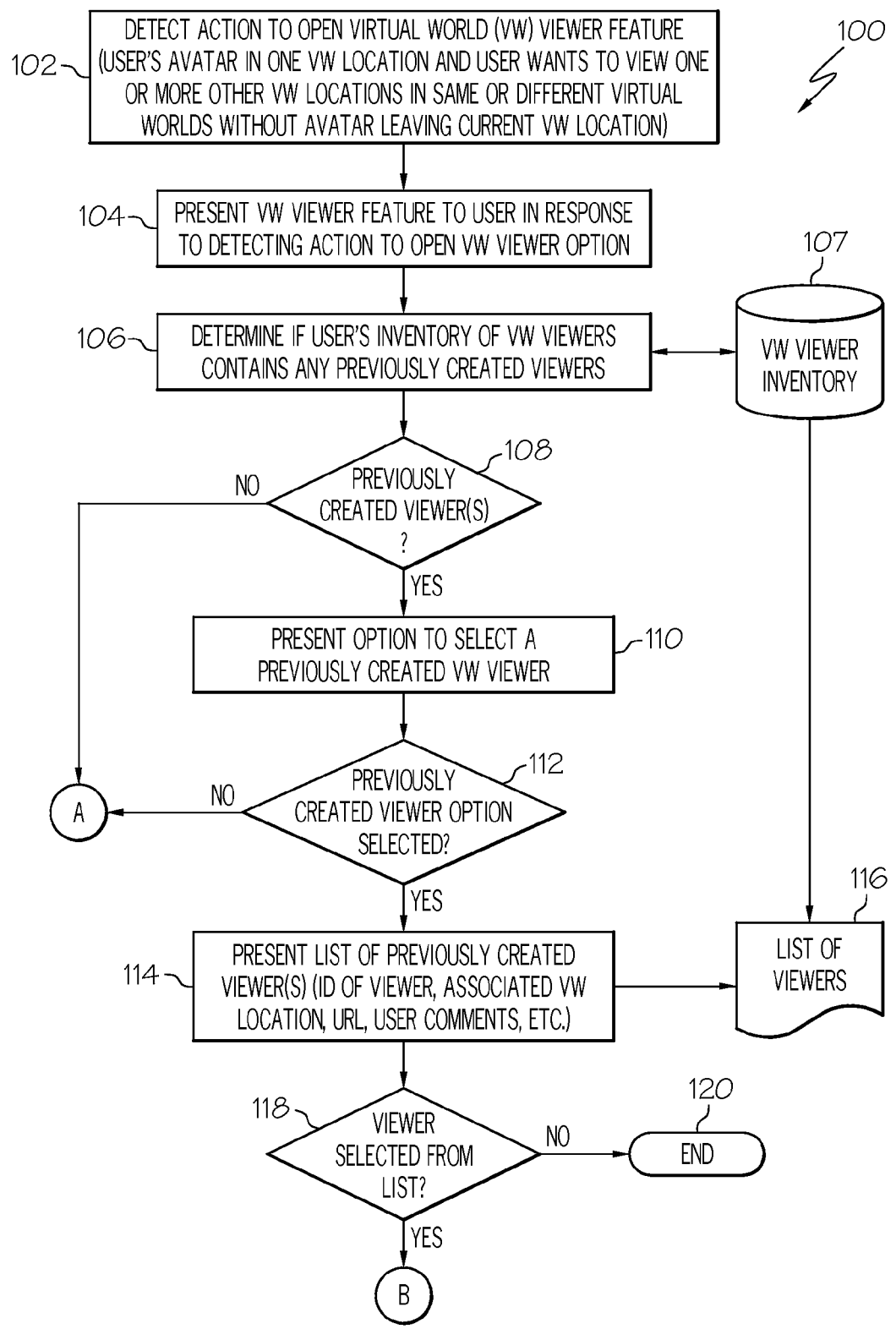
FIGS. 1A and 1B (collectively FIG. 1) is a flow chart of an example of a method for managing at least one virtual world viewer in a virtual world in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
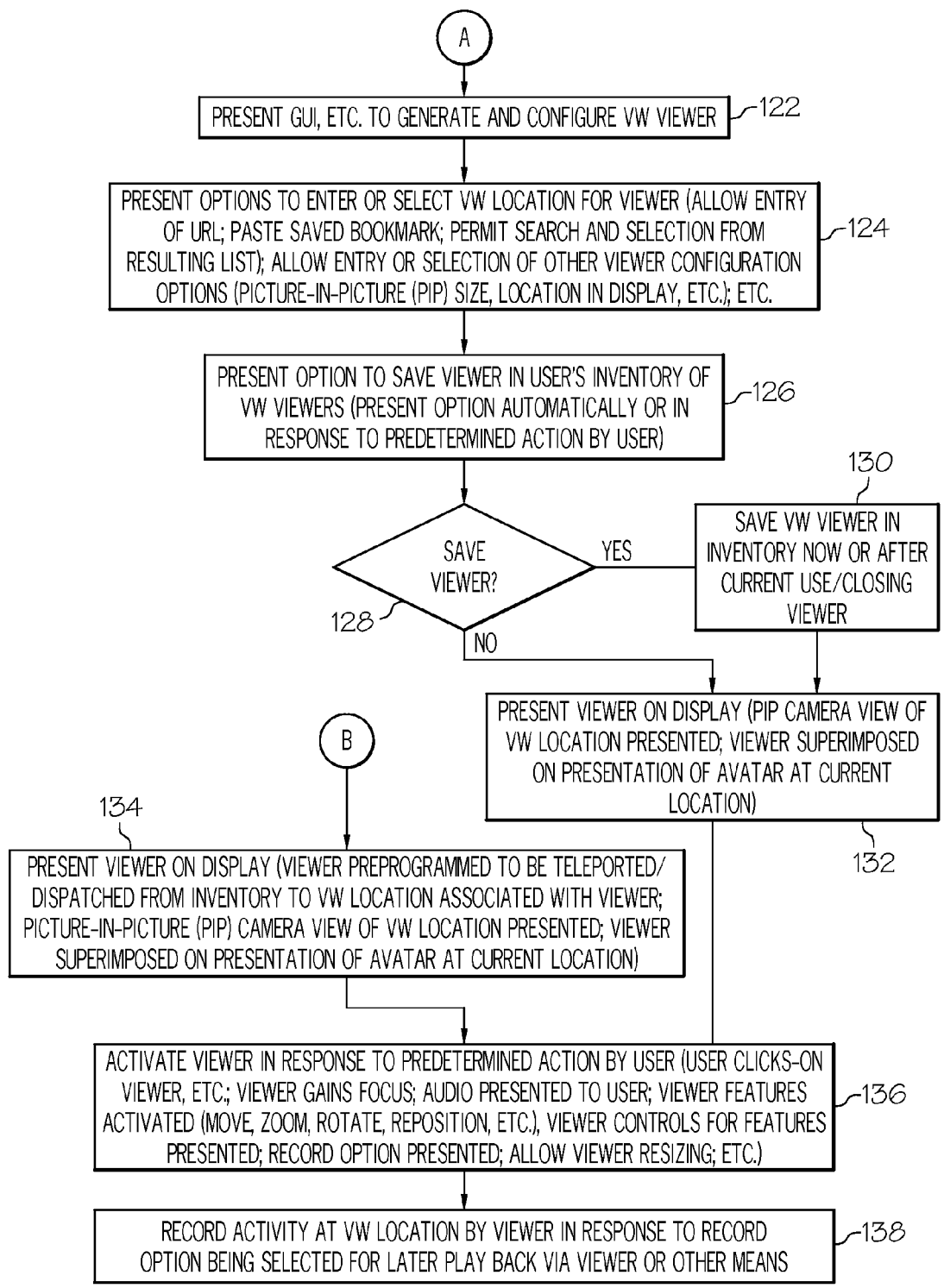

FIGS. 1A and 1B (collectively FIG. 1) is a flow chart of an example of a method 100 for managing virtual world (VW) viewers in a virtual world in accordance with an embodiment of the present invention. In one embodiment, a VW viewer allows the user to simultaneously view the user's avatar's current location along with one or more VW locations that are different and/or remote from the user's avatar's current VW location. The VW location may be displayed at the user's avatar's current location so that user's avatar does not have to leave the avatar's current location to view the other VW location or locations.

Referring first to FIG. 1A, in block 102, an action is detected to open a VW viewer feature. The VW viewer feature may present various options with respect to the VW viewer. The action detected to open the VW viewer feature may be any action initiated by the user, the user's avatar or other entity. For example, a user may indicate via a predetermined action that the user wants to simultaneously view one or more VW locations of one or more virtual worlds while viewing the user's avatar's current location. The predetermined action detected may relate to any action, including clicking the user's mouse, selecting an option via a drop down menu, depressing one or more keys on the user's keyboard, or any other action.

In block 104, in response to detecting an action to open the VW viewer feature, the VW viewer feature is generated and/or presented to the user. As previously discussed the VW viewer may present various options related to the VW viewer. For example, the VW viewer feature may display options to the user to present previously created VW viewers, as is discussed later with regard to block 110. Additionally, the VW viewer feature may display options to the user to generate a new VW viewer, as is discussed later with regard to block 122. The VW viewer feature may also include other options, such as options to manage the location and size of the VW viewer, recording options, and/or any other options associated with the VW viewer.

In block 106, a determination is made as to whether the user's VW viewer inventory 107 contains any previously created VW viewers. Any previously created VW viewers may be any VW viewers created and/or received by the user and/or any other person. The creation or generation of a VW viewer is described in greater detail with regard to blocks 122-130 of FIG. 1B. Any of the previously created VW viewers may be stored in the user's VW viewer inventory 107 or other storage location. The user's VW viewer inventory 107 may be a database or other repository to store the VW viewer for future use for the user.

In block 108, if no VW viewers are determined to be in the user's VW viewer inventory 107, the method 100 may advance to block 122 in FIG. 1B, which is described later.

Alternatively, in block 108, if any VW viewers are determined to be in the user's VW viewer inventory 107, the method 100 may proceed to block 110. In block 110, an option is generated and/or presented to either allow the user to select any previously created VW viewers or to allow the user to reject selecting a previously created VW viewer. The option may be presented in the VW viewer feature, which is discussed above with respect to block 104.

In block 112, if the user does not select the option to present any previously created VW viewers, the method 100 may be directed to block 122 of FIG. 1B. The user may not select the option to present any previously created VW viewers by rejecting the option, allowing the option to timeout, or any other means to indicate that the user would not like to select a previously created VW viewer. By not selecting the option to present any previously created VW viewers, the user may generate a new VW viewer.

Alternatively, in block 112, if the user selects the option to select a previously created VW viewer, the method 100 may proceed to block 114. The user may select the option to present any previously created VW viewers via a drop down menu, clicking the user's mouse, entering a key from the user's keyboard or any other means to indicate that the user desires to select a previously created VW viewer.

In block 114, a list 116 of one or more previously created viewers may be generated and/or presented to the user. Each entry of the list 116 of previously created viewers may include any information associate with the previously created VW viewer(s), such as each VW viewer ID, the VW location associated with each VW viewer, any user comments, and any other information related to the VW viewer. Any of the previously created VW viewers in the list 116 may be selected by one or more actions by the user.

In block 118, a determination is made as to whether or not any VW viewers are selected from the list 116 presented in block 114. If none of the previously created VW viewers are selected, the method 100 may end at block 120. Alternatively, if one or more of the previously created VW viewers are selected in block 114, the method 100 may proceed to block 134 of FIG. 1B.

Referring now to FIG. 1B, in block 122, a graphical user interface (GUI) or other input mechanism may be generated and/or presented to generate and configure a new VW viewer. The GUI or other input mechanism may be an interactive GUI and may be presented to the user any time information is desired or needed to be inputted.

In block 124, one or more options are generated and/or presented to enter or select a VW location for the VW viewer. The VW location may be entered or selected by allowing entry of a URL or website, pasting a saved bookmark into the GUI, permitting a search of VW locations and selecting one of the VW locations from the search result list, and any other way to identify and/or input at least one VW location. Additionally, entry or selection of other VW viewer configuration options may be presented to the user, such as a picture-in-picture (PIP) size, location in the display of the VW viewer, and the like. Other options related to the VW viewer may also be presented to the user for generation and/or configuration of the VW viewer.

In block 126, an option may be generated and/or presented to the user to save the VW viewer in the user's VW viewer inventory 107. In one embodiment, the option is presented automatically such that no user action is required. In another embodiment, the option is presented in response to a predetermined action by the user, such as selecting an option from a drop down menu, depressing at least one key on the user's keyboard or any other user action. Regardless, the option presented allows the user to indicate whether or not the user would like to save the VW viewer in the user's VW viewer inventory 107 or other storage location.

In block 128, a determination is made as to whether or not the user would like to save the VW viewer based on the user's input to the option presented in block 126. If the user indicates that VW viewer will not be saved, the method 100 may proceed directly to block 132, which is discussed below. However, if the user indicates a desire to save the VW viewer, the VW viewer is saved in the user's VW viewer inventory 107 and/or other location. The VW viewer may be saved at any time, such as immediately, prior to and/or after use of the VW viewer, after closing the viewer, and/or any other time. After the VW viewer is saved, the method 100 may proceed from block 130 to block 132.

In block 132, the VW viewer is generated and/or presented on a display. The VW viewer may be presented at any location on the display and in any manner, such as a PIP camera view of the VW location presented within the user's avatar's current VW location, superimposing the VW viewer on a presentation of the user's avatar's current location, a split screen view of the VW viewer along with the presentation of the user's avatar's current location, and any other display of the VW viewer. After the VW viewer is presented on the display, the method 100 may proceed to block 136.

As previously discussed if the user selects a previously created viewer from the list in block 118 of FIG. 1A, the method 100 advances to block 134 of FIG. 1B. In block 134, the previously created VW viewer may be generated and presented on a display. The VW viewer may be preprogrammed to be teleported and/or dispatched from the user's VW viewer inventory 107 to a VW location associated with the VW viewer selected. As previously discussed, the VW viewer may be presented at any location on the display and in any manner, such as a PIP camera view of the VW location presented within the current location of the user's avatar, superimposing the VW viewer on presentation of user's avatar's current location, a split screen view of the VW viewer along with the presentation of the user's avatar's current location, and any other display of the VW viewer.

In block 136, the presented VW viewer is activated in response to a predetermined action by user. Activation of the VW viewer allows the VW viewer to display the one or more VW locations associated with the VW viewer. As previously mentioned, the VW viewer's location may be presented at the user's avatar's current location while simultaneously displaying the user's avatar's current location. To activate the VW viewer, any action by the user may be employed, such as the user clicking on the VW viewer with the user's mouse, the user clicking an activation button, or any other user-initiated action. In one embodiment, the VW viewer may be activated automatically in response to presenting the viewer without any user action. In another embodiment, the VW viewer may be continuously and always activated while the VW viewer is presented. The VW viewer may be paused at any time by any action by the user. The VW viewer may automatically focus so that the presented video feed of the VW location is clear to the user. The audio feed of the VW viewer may automatically be presented along with the video of the VW viewer. The audio feed may be controlled such that an action by the user activates or deactivates the audio. Such user-initiated user activation of the audio of the VW viewer may occur at any time, such as prior to, after or simultaneously with receiving the video feed of the VW viewer. The user may activate any VW viewer features, such as move, zoom, rotate, and/or reposition of the VW location presented on the VW viewer. Such controls may be presented on the user's screen for user control.

A record option may also be presented to the user and activated by the user so that activity at the VW location can be recorded and/or stored at a storage location for future replay, as is discussed further with respect to block 138. In one embodiment, the VW viewer may present a recorded VW location instead of a live feed of the VW location. Other options, such as resizing of the VW viewer window, may be presented to the user.

In block 138, the activity at the VW location is recorded by the VW viewer in response to the record option discussed above in block 136 being activated. The recorded activity may be stored for later play back via the VW viewer or other means. Additionally, the recorded activity may be associated with and/or viewed in the VW viewer.

Figure 2:
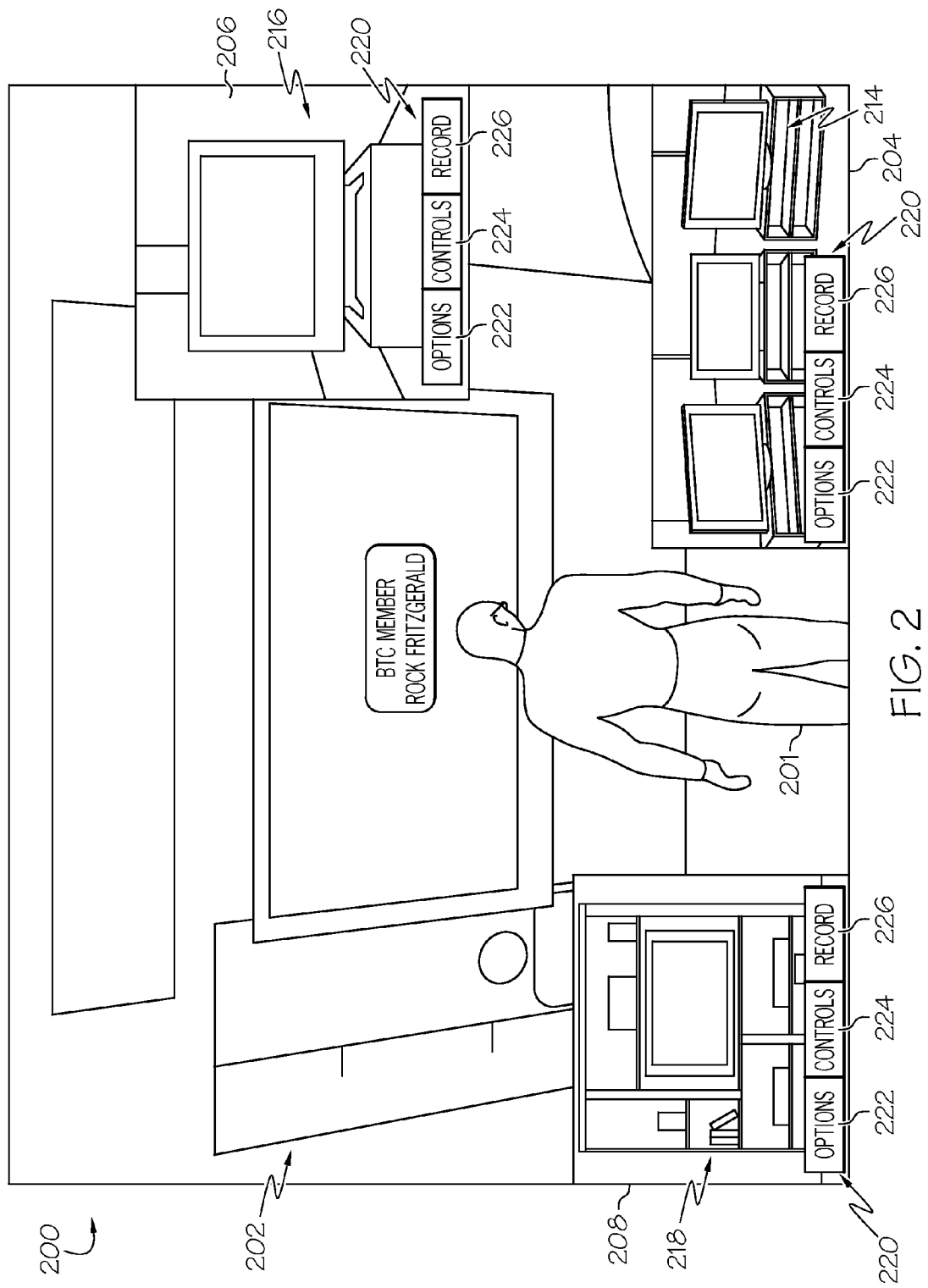
FIG. 2 is a screen shot of an example of a plurality of exemplary virtual world viewers, each presenting different locations of a virtual world in accordance with an embodiment of the present invention.

FIG. 2 is a screen shot 200 of an example of a plurality of virtual world viewers 204, 206, and 208, each presenting different portions or locations of a virtual world in accordance with an embodiment of the present invention. As illustrated, a user's avatar 201 is shown at a VW location 202. The plurality of VW viewers 204, 206, and 208 are already presented and activated at the VW location 202 to display different VW locations 214, 216, and 218, respectively. Each of the VW viewers 204, 206, and 208 are illustrated as having a user control panel 220 for the VW viewer features, which was previously described with regard to block 136 of FIG. 1B. The exemplary control panel 220 of each VW viewer 204, 206, and 208 may include an options feature 222, a controls feature 224, and a recording feature 226. The options feature 222 may present options related to the VW viewer 204, 206, and 208, such as allowing the user to select the displayed VW location, selecting the size and location of the VW viewer window at the user's avatar's current location, VW viewer save options, PIP options, activating/deactivating audio and/or video feed, closing the VW viewer and the like, similar to that previously described with regard to blocks 124, 126, and 136 of FIG. 1B. The controls feature 224 may present controls associated with the VW viewer, such as moving, zooming, rotating, repositioning and/or other controls of the VW location on the VW viewer display, similar to that previously discussed with regard to block 136 of FIG. 1B. The record feature 226 may present recording options, such as activate/deactivate recording of the VW viewer, save options of the recorded activity, and the like.

In the example illustrated in FIG. 2, the VW viewers 204, 206, and 208 are shown as PIP views at the user's avatar current location 202 in the virtual world. The user's avatar's current location 202 is at a retail location in the virtual world where a virtual world television is located. Each of the VW viewers 204, 206, and 208 are configured to display other virtual world televisions at other VW locations 214, 216, and 218 so that the user and user's avatar 201 can compare all of the televisions against each other, even though the televisions are each located at different VW locations.

The user may activate any VW viewer features in the control panel 220, such as move, zoom, rotate, and/or reposition of the VW location presented on the VW viewer 204, 206, and 208. Such controls may be presented on the user's screen for user control.

FIG. 3 is a block schematic diagram of an example of a system 300 of a virtual world viewer in a virtual world in accordance with an embodiment of the present invention. The system 300 may include a module for a virtual world viewer 302 operable on a computer system 304, or similar device of a user 306 or client. Alternatively, or in addition to the virtual world viewer module 302 on the user's computer system 304 or client, the system 300 may include a server virtual world viewer module 308 operable on a server 310 and accessible by the user 306 or client 304 via a network 312. The method 100 may be embodied in or performed by the virtual world viewer module 302 and/or the server virtual world viewer module 308. In one embodiment, the method 100 may be wholly performed by the virtual world viewer module 302. In another embodiment of the invention, the method 100 may be wholly performed by the server virtual world viewer module 308. In a further embodiment of the present invention, some of the features or functions of the method 100 may be performed by the virtual world viewer module 302 on the user's computer system 304 or client and other features or functions of the method 100 may be performed on the server virtual world viewer module 308.

A virtual world simulation system 314 may be operable on the server 310 and may be accessible by a plurality of users 306 or participants using an Internet browser 315 on their respective computer systems 304 or clients. The virtual world simulation system 314 may be Second Life™ or a similar virtual world system. The virtual world viewer modules 302 and 308 may be part of the virtual world simulation system 314 or may be separate applications or modules that interface with the virtual world simulation system 314. The network 312 may be the Internet, a private network or other network. Each computer system 304 may be similar to the exemplary computer system 304 and associated components illustrated in FIG. 3.

The virtual world viewer module 302 and/or 308 may be a self contained system with embedded logic, decision making, state based operations and other functions that may operate in conjunction with a virtual world simulation, such as Second Life™. The self contained system may allow businesses, individuals, services, locations, and the like in the virtual world to interact.

The virtual world viewer module 302 and the Internet browser 315 may be stored on a file system 316 or memory of the computer system 304. The virtual world viewer module 302 and Internet browser 315 may be accessed from the file system 316 and run on a processor 318 associated with the computer system 304. The Internet browser 315 may include one or more bookmarks 328. Each of the bookmarks 328 may be used to store a VW location.

The virtual world viewer module 302 may include a module for generation and configuration of a VW viewer 320 (hereinafter "VW viewer generation and configuration module"). The VW viewer generation and configuration module 320 allows the user to input various parameters into the computer system 304, such as entry or selection of the VW location to be displayed by the VW viewer, VW location search and selection parameters, PIP options, VW viewer location on the display 330, VW viewer size, storage options, notifications, computer display options, and the like. The VW viewer generation and configuration module 320 may be accessed or activated whenever the user desires to input information and may call other modules such as a VW viewer inventory 322 or bookmarks 328 as described below. The VW viewer generation and configuration module 320 also allows input of scripts, programs, applications, autonomous actions and other defining parameters that may be associated by a VW viewer. Input may be allowed via any manner, such as presenting one or more interactive GUIs.

The virtual world viewer module 302 may also include the VW viewer inventory 322. The VW viewer inventory 322 may include one or more VW viewers that were previously created and/or configured. After the user creates a VW viewer, as described above with reference to the VW viewer generation and configuration module 320, the VW viewer may be stored on the computer system 304. The VW viewer inventory 322 may be activated or accessed at any time.

The virtual world viewer module 302 may also include a module for VW viewer controller 324. As previously discussed, the user may control actions of the VW viewer, such as record activity at a VW location, replay recorded activity, control audio/video output of the VW viewer, perform movements of the VW viewer at the VW location, including move, zoom, reposition, rotate, and the like or any other actions that may be desirable or allowable for the VW viewer to perform.

These actions may be performed via the VW viewer controller 324 at any time the VW viewer is presented.

The virtual world viewer module 302 may also store any recorded VW location activity 326, including recorded observations, recorded interactions, recorded views at the VW location or other recorded activities. The recorded VW location activity 326 may be stored on the computer system 304 and may be replayed, distributed, and/or viewed at any time.

The user's computer system 304 may also include a display 330 and a speaker 332 or speaker system. The display may present the virtual world and the user's avatar and any virtual world viewers as described herein and may permit control of the user's avatar and the virtual world viewers. Any GUIs associated with the virtual world viewers may also be presented on the display 330. The speaker 332 may present any voice or other auditory signals or information to the user 306.

The user's computer system 304 may also include one or more input devices, output devices or combination input and output device, collectively I/O devices 334. The I/O devices 334 may include a keyboard, computer pointing device or similar means to control operation of avatars and VW viewer features and to enter information into various GUIs as described herein. The I/O devices 334 may also include disk drives or devices for reading computer media including computer-readable or computer-operable instructions.

The virtual world viewer module 302, 308 may present one or more predetermined GUIs, similar to the GUIs described with respect to the block 122 of FIG. 1, to permit the VW viewer to be generated and/or configured. The GUIs may include a GUI to allow the user to enter functionality of the VW viewer, as previously discussed. These GUIs may be predetermined and presented in response to the user indicating the user would like to enter information and/or settings. The predetermined GUIs may be generated by the virtual world viewer module 302, 308 and may be presented on the display 330 of the computer system 304. The GUIs may also include GUIs to permit a virtual world system operator or owner to manage the VW viewer feature, such as predefining VW viewer functionalities, managing and monitoring each VW viewer, as well as any other functions or features associated with each VW viewer, as previously discussed.

The server virtual world viewer module 308 may include VW viewer generation and configuration module 340, VW viewer inventory 342, VW viewer controller 344, and/or recorded VW location activity 346. These modules 340, 342, 344, and 346 of the server virtual world viewer module 308 may be similar to the above-described VW viewer generation and configuration module 320, VW viewer inventory 322, VW viewer controller 324, and recorded VW location activity 326, respectively, of the virtual world viewer module 302, described above. For example, the functionality of modules 320, 322, 324, and/or 326 of the virtual world viewer module 302 may be performed by modules 340, 342, 344, and/or 346 of the server virtual world viewer module 308. In an embodiment of the present invention, some of the features or functions of the method 100 may be performed by modules 320, 322, 324, and/or 326 of the virtual world viewer module 302 on the user's computer system 304 and other features or functions of the method 100 may be performed by modules 340, 342, 344, and/or 346 on the server virtual world viewer module 308 on the server 310.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for managing at least one virtual world viewer, comprising:
    generating a virtual world viewer feature on a computer system in response to a predetermined action by a user;
    generating an option in the virtual world viewer feature for the user to one of enter and select a different virtual world location from a current virtual world location of a user's avatar for locating a virtual world viewer for viewing the different virtual world location;
    generating the virtual world viewer on the computer system for viewing the different virtual world location simultaneously with the current virtual world location without the user's avatar leaving the current virtual world location;
    providing an option to save the virtual world viewer for viewing the different virtual world location in a user's inventory of virtual world viewers; and
    providing one or more viewer controls in the virtual world viewer of the different virtual world location for controlling at least a position of a view of the different virtual world location within the virtual world viewer.

2. The computer implemented method of claim 1, further comprising:
    determining if a previously created virtual world viewer exists in the user's inventory of virtual world viewers; and
    generating an option on the computer system for the user to select the previously created virtual world viewer in response to determining that the previously created virtual world viewer exists.

3. The method of claim 2, further comprising teleporting the previously created virtual world viewer from the user's inventory of virtual world viewers to a virtual location associated with the previously created virtual world viewer in response to the user selecting the previously created virtual world viewer.

4. The computer implemented method of claim 1, further comprising activating the virtual world viewer in response to a predetermined action by the user.

5. The computer implemented method of claim 4, wherein activating the virtual world viewer comprises at least one of:
- generating a real-time image of the virtual world location associated with the virtual world viewer;
- providing audio of the virtual world location associated with the virtual world viewer;
- providing the one or more viewer controls for controlling at least one feature of the virtual world viewer; and
- activating a particular feature of the virtual world viewer in response to the viewer control associated with the particular feature being selected.

6. The computer implemented method of claim 5, wherein providing the one or more viewer controls in the virtual world viewer comprises:
- providing a viewer control to reposition the virtual world viewer;
- providing a viewer control to rotate the virtual world viewer;
- providing a viewer control to zoom the virtual world viewer in and out;
- providing a viewer control to resize the virtual world viewer; and
- providing an option to record activity at the virtual world location of the virtual world viewer.

7. The computer implemented method of claim 1, further comprising providing a plurality of virtual world viewers to view a plurality of virtual world locations at the user's avatar's virtual world location.

8. The computer implemented method of claim 7, further comprising activating one of the plurality of virtual world viewers in response to a predetermined action by the user.

9. The computer implemented method of claim 1, further comprising:
- generating a list of previously created virtual world viewers in response to activation of an option to select a previously created virtual world viewer; and
- receiving a selection of at least one of the previously created virtual world viewers from the list of the previously created virtual world viewers.

10. The computer implemented method of claim 1, wherein generating the virtual world viewer comprises at least one of:
- teleporting the virtual world viewer to the virtual world location associated with the virtual world viewer;
- generating a picture-in-picture view of the virtual world location associated with the virtual world viewer on the current virtual world location of the user's avatar; and
- superimposing the virtual world viewer on the current virtual world location of the user's avatar.

11. The computer implemented method of claim 1, further comprising providing an interface to generate and configure the virtual world viewer in response to determining that the inventory of virtual world viewers does not contain any previously created virtual world viewers of a particular virtual world location.

12. The computer implemented method of claim 1, wherein generating the option in the virtual world viewer feature for the user to one of enter and select a different virtual world location for the virtual world viewer comprises at least one of:
- allowing entry by the user of a URL of a virtual world location;
- providing for selection of a bookmark of a saved virtual world location;
- permitting a search of virtual world locations, presenting a list of results from the search, and permitting a selection from the search results list; and
- allowing manual entry of a virtual world location.

13. The computer implemented method of claim 1, further comprising configuring the virtual world viewer, wherein configuring the virtual world viewer comprises at least one of:
- configuring a picture-in-picture size;
- locating of the virtual world viewer on a display of the computer system;
- sizing the virtual world viewer; and
- setting recording options.

14. The computer implemented method of claim 1, further comprising recording activity at the virtual world location associated with the virtual world viewer in response to a record option being selected for later playback.

15. The method of claim 1, further comprising providing an audio control in the virtual world viewer to activate and deactivate an audio feed from the virtual world location.

16. A system for managing at least one virtual world viewer, comprising:
- a processor; and
- a module operable on the processor to:
- generate a virtual world viewer feature in response to a predetermined action by a user;
- generate an option in the virtual world viewer feature for the user to one of enter and select a different virtual world location from a current virtual world location of a user's avatar for locating a virtual world viewer for viewing the different virtual world location;
- generate the virtual world viewer to view the different virtual world location simultaneously with the current virtual world location without the user's avatar leaving the current virtual world location;
- provide an option to save the virtual world viewer for viewing the different virtual world location in a user's inventory of virtual world viewers; and
- provide one or more viewer controls in the virtual world viewer of the different virtual world location for controlling at least a position of a view of the different virtual world location within the virtual world viewer.

17. The system of claim 16, wherein the module operable on the processor is configured to activate the virtual world viewer in response to a predetermined action.

18. The system of claim 16, wherein generating the virtual world viewer comprises at least one of:
- teleporting the virtual world viewer to the virtual world location associated with the virtual world viewer;
- generating a picture-in-picture view of the virtual world location associated with the virtual world viewer on the current virtual world location of the user's avatar; and
- superimposing the virtual world viewer on a presentation of the current virtual world location of the user's avatar.

19. A computer program product for managing at least one virtual world viewer, comprising:
- a computer usable storage medium having computer usable program code embodied therein, the computer usable storage medium comprising:
- computer usable program code configured to generate a virtual world viewer feature in response to a predetermined action by the user;
- computer usable program code configured to generate an option in the virtual world viewer feature for the user to one of enter and select a different virtual world location from a current virtual world location of a user's avatar for locating a virtual world viewer for viewing the different virtual world location;

computer usable program code configured to generate the virtual world viewer for viewing the different virtual world location simultaneously with the current virtual world location without the user's avatar leaving the current virtual world location;

computer usable program code configured to provide an option to save the virtual world viewer for viewing the different virtual world location in a user's inventory of virtual world viewers; and computer usable program code configured to provide one or more viewer controls in the virtual world viewer of the different virtual world location for controlling at least a positioning of a view of the different virtual world location within the virtual world viewer.

20. The computer program product of claim 19, wherein the computer usable storage medium further comprises computer usable program code configured to activate the virtual world viewer in response to a predetermined action by the user.

21. The computer program product of claim 20, wherein the computer usable program code configured to activate the virtual world viewer comprises at least one of:

computer usable program code configured to generate a real-time image of the virtual world location associated with the virtual world viewer;

computer usable program code configured to provide audio of the virtual world location associated with the virtual world viewer;

computer usable program code configured to provide the one or more viewer controls for controlling at least one feature of the virtual world viewer; and computer usable program code configured to activate a particular feature of the virtual world viewer in response to the viewer control associated with the particular feature being selected.

22. The computer program product of claim 19, wherein the computer usable storage medium further comprises computer usable program code configured to activate one of a plurality of virtual world viewers in response to a predetermined action by the user.

23. The computer program product of claim 19, wherein the computer usable program code configured to generate the virtual world viewer comprises at least one of:

computer usable program code configured to teleport the virtual world viewer to the virtual world location associated with the virtual world viewer;

computer usable program code configured to present a picture-in-picture view of the virtual world location associated with the virtual world viewer on the current virtual world location of the user's avatar; and computer usable program code configured to superimpose the virtual world viewer on a presentation of the current virtual world location of the user's avatar.

24. The computer program product of claim 19, wherein the computer usable program code configured to generate the option in the virtual world viewer feature for the user to one of enter and select a different virtual world location for the virtual world viewer comprises at least one of:

computer usable program code configured to allow entry by the user of a URL of a virtual world location;

computer usable program code configured to provide for selection of a bookmark of a saved virtual world location;

computer usable program code configured to permit a search of virtual world locations, presenting a list of results from the search, and permitting a selection from the search results list; and computer usable program code configured to allow manual entry of a virtual world location.

25. The computer program product of claim 19, wherein the computer usable storage medium further comprises:

computer usable program code configured to generate a list of previously created virtual world viewers in response to activation of an option to select a previously created virtual world viewer; and computer usable program code configured to receive a selection of at least one of the previously created virtual world viewers from the list of the previously created virtual world viewers.

26. The computer program product of claim 19, wherein the computer usable storage medium further comprises computer usable program code configured to record activity at the virtual world location associated with the virtual world viewer in response to a record option being selected for later playback.

* * * * *